United States Patent
Kazban et al.

(10) Patent No.: US 8,553,705 B2
(45) Date of Patent: *Oct. 8, 2013

(54) APPARATUS AND METHODS FOR ESTABLISHING VIRTUAL PRIVATE NETWORKS IN A BROADBAND NETWORK

(75) Inventors: Michael Kazban, Milpitas, CA (US); Mitri Halabi, San Jose, CA (US); Ken Koenig, Saratoga, CA (US); Vinai Sirkay, Los Gatos, CA (US)

(73) Assignee: Tellabs San Jose, Inc., Naperville, IL (US)

( * ) Notice: Subject to any disclaimer, the term of this patent is extended or adjusted under 35 U.S.C. 154(b) by 128 days.

This patent is subject to a terminal disclaimer.

(21) Appl. No.: 13/205,158

(22) Filed: Aug. 8, 2011

(65) Prior Publication Data

US 2011/0286364 A1 Nov. 24, 2011

Related U.S. Application Data

(63) Continuation of application No. 11/019,012, filed on Dec. 21, 2004, now Pat. No. 8,014,411, which is a continuation of application No. 09/803,090, filed on Mar. 8, 2001, now Pat. No. 6,847,641.

(51) Int. Cl.
*H04L 12/28* (2006.01)

(52) U.S. Cl.
USPC .................................. 370/395.51

(58) Field of Classification Search
None
See application file for complete search history.

(56) References Cited

U.S. PATENT DOCUMENTS

| | | | |
|---|---|---|---|
| 5,991,300 A | 11/1999 | Tappan | |
| 6,104,700 A | 8/2000 | Haddock et al. | |
| 6,111,673 A | 8/2000 | Chang et al. | |
| 6,205,488 B1 | 3/2001 | Casey et al. | |
| 6,341,127 B1 | 1/2002 | Katsube et al. | |
| 6,507,577 B1 * | 1/2003 | Mauger et al. | 370/356 |
| 6,574,224 B1 * | 6/2003 | Brueckheimer et al. | 370/395.6 |
| 6,724,722 B1 | 4/2004 | Wang et al. | |
| 6,765,921 B1 | 7/2004 | Stacey et al. | |

(Continued)

FOREIGN PATENT DOCUMENTS

| CA | 2 358 698 A1 | 3/2000 |
|---|---|---|
| EP | 1 056 245 A2 | 11/2000 |

(Continued)

OTHER PUBLICATIONS

Rosen, E. and Rekhter, Y, Cisco Systems, Inc., RFC # 2547, "BGP/MPLS VPNs" 25 pages, Mar. 1999.

(Continued)

*Primary Examiner* — Raj Jain
(74) *Attorney, Agent, or Firm* — Hamilton, Brook, Smith & Reynolds, P.C.

(57) ABSTRACT

Service providers can reduce multiple overlay networks by creating multiple logical service networks (LSNs) on the same physical or optical fiber network through use of an embodiment of the invention. The LSNs are established by the service provider and can be characterized by traffic type, bandwidth, delay, hop count, guaranteed information rates, and/or restoration priorities. Once established, the LSNs allow the service provider to deliver a variety of services to customers depending on a variety of factors, for example, a customer's traffic specifications. Different traffic specifications are serviced on different LSNs depending on each LSN's characteristics. Such LSNs, once built within a broadband network, can be customized and have its services sold to multiple customers.

27 Claims, 3 Drawing Sheets

(56) References Cited

U.S. PATENT DOCUMENTS

| | | | |
|---|---|---|---|
| 6,847,641 B2 | 1/2005 | Kazban et al. | |
| 6,886,043 B1* | 4/2005 | Mauger et al. | 709/238 |
| 6,950,407 B1* | 9/2005 | Huddle | 370/254 |
| 6,965,572 B1* | 11/2005 | Boodaghians | 370/249 |
| 7,120,151 B1 | 10/2006 | Ginjpalli et al. | |
| 7,260,097 B2 | 8/2007 | Casey | |
| 7,277,386 B1 | 10/2007 | Ferguson et al. | |
| 7,277,931 B1* | 10/2007 | Booth et al. | 709/220 |
| 8,014,411 B2* | 9/2011 | Kazban et al. | 370/409 |
| 2001/0026549 A1* | 10/2001 | Hameleers et al. | 370/389 |
| 2002/0097730 A1 | 7/2002 | Langille et al. | |
| 2002/0114274 A1 | 8/2002 | Sturges et al. | |
| 2003/0088699 A1 | 5/2003 | Luciani et al. | |

FOREIGN PATENT DOCUMENTS

| | | |
|---|---|---|
| EP | 1 065 858 A2 | 1/2001 |
| EP | 1 069 742 A2 | 1/2001 |
| WO | WO 02/073909 A1 | 9/2002 |

OTHER PUBLICATIONS

Rosen, E., Cisco Systems, Inc., RFC # 4364, BGP/MPLS IP Virtual Private Networks (VPNs); 47 pages, Feb. 2006.
Komella, K., et al., "MPLS-based Layer 2 VPNs,"23 pages, Apr. 2001.
Lasserre, M., et al. "Transparent VLAN Services over MPLS," 16 pages, May 2002.
Ferguson, P., et al., "The Internet Protocol Journal,", vol. 1, No. 1, pp. 1-19, Jun. 1998.
Ferguson, P., et al.., "The Internet Protocol Journal,", vol. 1, No. 2, pp. 1-18, Sep. 1998.
International Search Report of PCT/US02/07246 dated Jul. 15, 2002.
European Search Report of EP 10 012 763 dated Feb. 1, 2011.
European Search Report of EP 02 717 596 dated Apr. 20, 2010.
European Search Report of EP 02 717 596 dated Nov. 8, 2007.

* cited by examiner

APPARATUS AND METHODS FOR ESTABLISHING VIRTUAL PRIVATE NETWORKS IN A BROADBAND NETWORK

RELATED APPLICATIONS

This Application is a continuation of U.S. application Ser. No. 11/019,012, filed Dec. 21, 2004 now U.S. Pat. No. 8,014,411 (now allowed), which is a continuation of U.S. application Ser. No. 09/803,090 (issued as U.S. Pat. No. 6,847,641), filed Mar. 8, 2001, entitled "Apparatus and Methods for Establishing Virtual Private Networks in a Broadband Network," which relates to U.S. application Ser. No. 09/737,916 (issued as U.S. Pat. No. 6,741,562), entitled "Apparatus and Methods for Managing Packets in a Broadband Data Stream," filed on Dec. 15, 2000, and U.S. application Ser. No. 09/737,917 (issued as U.S. Pat. No. 6,987,732), entitled "Apparatus and Methods for Scheduling Packets in a Broadband Data Stream," filed on Dec. 15, 2000, and U.S. application Ser. No. 09/661,244, entitled "Apparatus and Methods for Processing Packets in a Broadband Data Stream," filed on Sep. 13, 2000. The above Applications are hereby incorporated by reference in their entireties.

BACKGROUND OF THE INVENTION

As the Internet evolves into a worldwide commercial data network for electronic commerce and managed public data services, increasingly, customer demands focus on the need for advanced Internet Protocol (IP) services to enhance content hosting, broadcast video and application outsourcing. To remain competitive, network operators and Internet service providers (ISPs) must resolve two main issues: meeting continually increasing backbone traffic demands and providing a suitable Quality of Service (QoS) for that traffic. Currently, many ISPs have implemented various virtual path techniques to meet the new challenges. Generally, the existing virtual path techniques require a collection of physical overlay networks and equipment. The most common existing virtual path techniques are: optical transport, asynchronous transfer mode (ATM)/frame relay (FR) switched layer, and narrowband Internet protocol virtual private networks (IP VPN). FIG. 1 schematically illustrates the common existing virtual path switched layers.

The optical transport technique 102 is the most widely used virtual path technique. Under this technique, an ISP uses point-to-point broadband bit pipes to custom design a point-to-point circuit or network per customer. Thus, this technique requires the ISP to create a new circuit or network whenever a new customer is added. Once a circuit or network for a customer is created, the available bandwidth for that circuit or network remains static. The ATM/FR switched layer technique 104 provides QoS and traffic engineering via point-to-point virtual circuits. Thus, this technique does not require the creation of dedicated physical circuits or networks, as is the case with the optical transport technique 102. Although this technique 104 is an improvement over the optical transport technique 102, this technique 104 has several drawbacks. One major drawback of the ATM/FR technique 104 is that this type of network is not scalable. In addition, the ATM/FR technique 104 also requires that a virtual circuit be established every time a request to send data is received from a customer.

The narrowband IP VPN technique 106 uses best effort delivery and encrypted tunnels to provide secured paths to the customers. One major drawback of a best effort delivery is the lack of guarantees that a packet will be delivered at all. Thus, this is not a good candidate when transmitting critical data.

SUMMARY OF THE INVENTION

According to an example embodiment, there is provided a method for establishing virtual private networks in a communication network. The method comprises creating a set of label switched path trunks, assigning a trunk label to each of the label switched path trunks, and configuring a set of logical service networks via multiprotocol labels to carry multiple virtual private network paths using the label switched path trunks. In an example embodiment, each of the label switched path trunks provides a class of services and a trunk label associated with each label switched path trunk identifies the class of services, provided by that trunk. In one embodiment, creating the set of label switched path trunks includes creating the set of label switched path trunks at each service location. A service provider may wish to provide services at multiple service locations. In an example embodiment, the logical service networks are configured statically via service provider input. In another example embodiment, the logical service networks are configured automatically via software.

According to another example embodiment, there is provided a method comprising stacking a trunk label on a multiprotocol label switching stack, assigning a unique identifier to a customer site, and stacking the unique identifier on the trunk label. In another embodiment, the method further comprises assigning a unique group identifier to customer sites for a customer and establishing at least one virtual path between the customer sites.

Further example embodiments of the present invention provide for a virtual private network with a set of label switched path trunks. A label switched path trunk is defined for a class of services. A trunk label identifies the class of services for the label switched path trunk. A set of logical service networks are configured via multiprotocol labels to carry multiple virtual private network paths via the label switched path trunks.

A set of label switched path trunks may be defined at each service location. The set of logical service networks may be configured statically or automatically. In one embodiment, a trunk label is stacked on a multiprotocol label switching stack. A unique identifier may be assigned to a customer site by stacking the unique identifier on the trunk label. A unique group identifier may be associated with customer sites for a designated customer. The virtual private network uses the unique group identifier to form at least one virtual path between the customer sites.

Example embodiments of the present invention allow service providers to reduce multiple overlay networks by creating multiple logical service networks (LSNs) on a physical or optical fiber network. The LSNs are established by the service provider and can be characterized by traffic type, bandwidth, delay, hop count, guaranteed information rates, and/or restoration priorities. Once established, the LSNs allow the service provider to deliver a variety of services to different customers depending on each customer's traffic specifications. For example, different traffic specifications are serviced on different LSNs depending on each LSN's characteristics. In addition, such LSNs, once built within a broadband network, can be customized and sold to multiple customers.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Example embodiments of the present invention relate generally to apparatus and methods for establishing virtual private networks. In particular, embodiments of the present invention relate to apparatus and methods for establishing virtual private networks in a broadband network.

Thus, it is a goal of example embodiments of the present invention to provide apparatus and methods that reduce operating costs for service providers by collapsing multiple overlay networks into a multiservice IP backbone. In particular, it is a goal of example embodiments of the present invention to provide apparatus and methods that allow an ISP to build the network once and sell such network multiple times to multiple customers.

Figure 1:
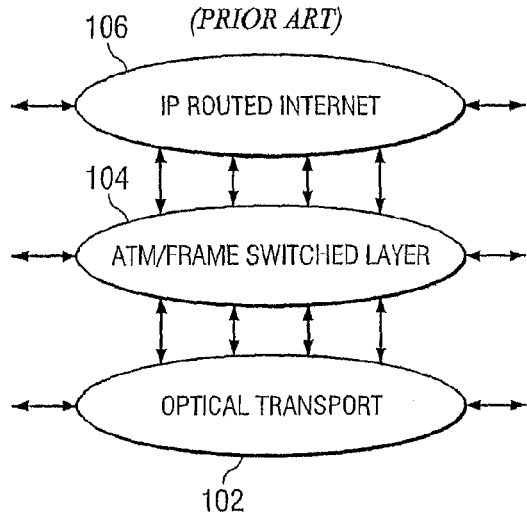
FIG. 1 schematically illustrates a prior art virtual path implementation.
Figure 2:
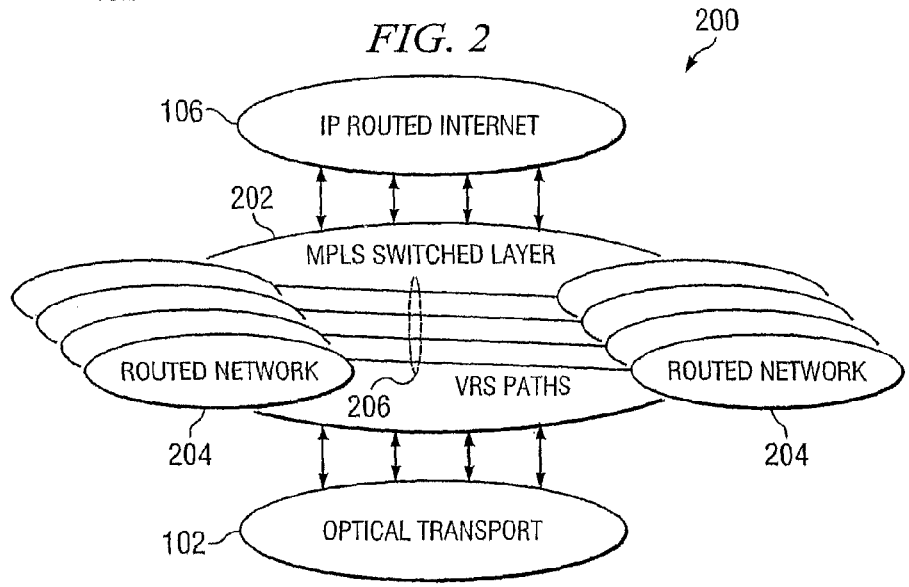
FIG. 2 schematically illustrates an example virtual path implementation in accordance with an embodiment of the invention.

FIG. 2 schematically illustrates example virtual path switched layers 200 in accordance with an example embodiment of the invention. The virtual path switched layers 200 combine switching and routing to provide virtual services. In particular, the virtual path switched layers 200 combine the strengths of layer 106 (i.e., scalability and flexibility) and layer 202 (i.e., security and quality of service). In FIG. 2, a multiprotocol label switching (MPLS) switched layer 202 replaces the ATM/FR switched layer 104 in FIG. 1. Multiple label switched path trunks (LSP trunks) are set up as trunk groups in the optical transport layer 102 for transporting multiple virtual routing services (VRS) paths 206. The LSP trunks allow service providers to engineer traffic. In an example embodiment, virtual routed networks 204 are located at the edge of the MPLS switched layer 202. The VRS paths 206 are connected to virtual routed networks 204 via the MPLS switched layer 202. In one example embodiment, VRS routed networks 204 are uniquely identified; thus, security is guaranteed. In an example embodiment, non-VRS traffic is routed to an Internet router via the IP routed Internet layer 106. In an example embodiment, the virtual path switched layers 200 do not maintain Internet routing tables known in the art.

Figure 3:
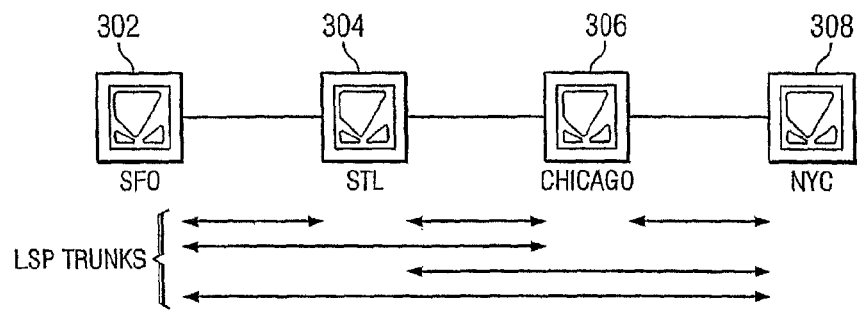
FIG. 3 schematically illustrates example LSNs in accordance with an embodiment of the invention.

FIG. 3 schematically illustrates example LSNs in accordance with an example embodiment of the invention. A service provider creates LSP trunks at each location of service. For example, multiple LSP trunks are created in San Francisco, St. Lewis, Chicago, and New York City. In an example embodiment, an LSP trunk is established for each service class. Each LSP trunk may be implemented using the technology described in the commonly assigned co-pending patents and patent applications: U.S. application Ser. No. 09/737,916 (issued as U.S. Pat. No. 6,741,562), entitled "Apparatus and Methods for Managing Packets in a Broadband Data Stream," filed on Dec. 15, 2000, and U.S. application Ser. No. 09/737,917 (issued as U.S. Pat. No. 6,987,732), entitled "Apparatus and Methods for Scheduling Packets in a Broadband Data Stream," filed on Dec. 15, 2000, and U.S. application Ser. No. 09/661,244, entitled "Apparatus and Methods for Processing Packets in a Broadband Data Stream," filed on Sep. 13, 2000; all of which are expressly incorporated by reference in their entireties.

In an example embodiment, each LSP trunk is identified by a trunk label. In one embodiment, such a trunk label also identifies the class of services assigned to the associated LSP trunk. In one embodiment, LSP trunk labels (302, 304, 306, and 308) are pushed onto an MPLS stack. LSNs are established based on the created LSP trunks. In one embodiment, LSNs are established statically by service provider input. In another embodiment, LSNs are established automatically by software. After LSNs are established or built, customer and customer traffic can be customizably added to such networks.

Figure 4:
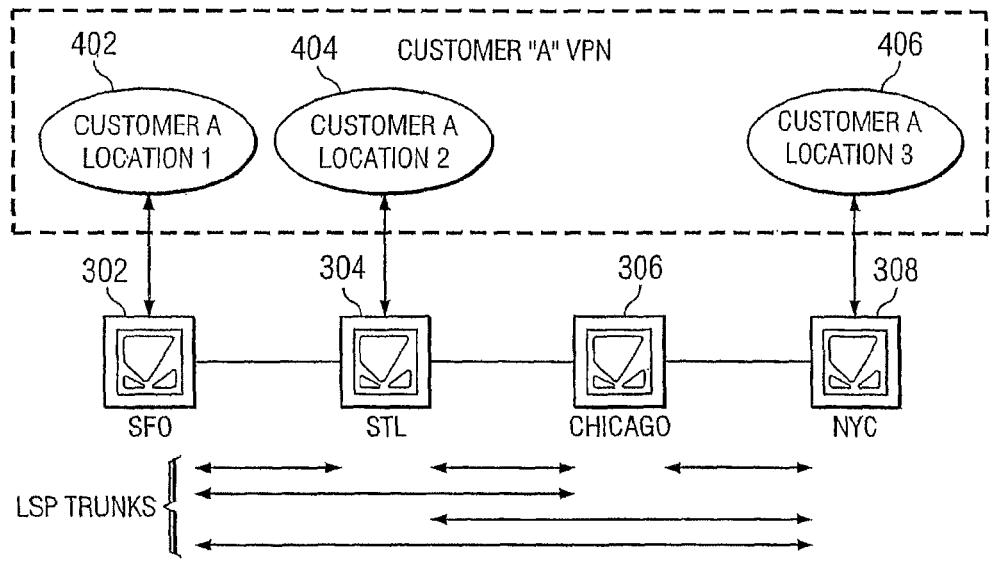
FIG. 4 schematically illustrates an example VPN in accordance with an embodiment of the invention.

FIG. 4 schematically illustrates an example VPN for a customer in accordance with an embodiment of the invention. In FIG. 4, a customer A signs up for services at multiple locations (customer sites). In one embodiment, each customer site is assigned a unique identifier (e.g., a VPN label). In an example embodiment, such a unique identifier is stacked on top of the trunk label in the MPLS stack. For example, in FIG. 4, customer A at location 1 is assigned a label 402 stacked on top of LSP trunk 302, customer A at location 2 is assigned a label 404 stacked on top of LSP trunk 304, and customer A at location 3 is assigned a label 406 stacked on top of LSP trunk 308. In an example embodiment, customer sites for a customer are then grouped and assigned a unique VPN group label "A". The unique VPN group label "A" associates customer sites of customer A in a private network.

Figure 5:
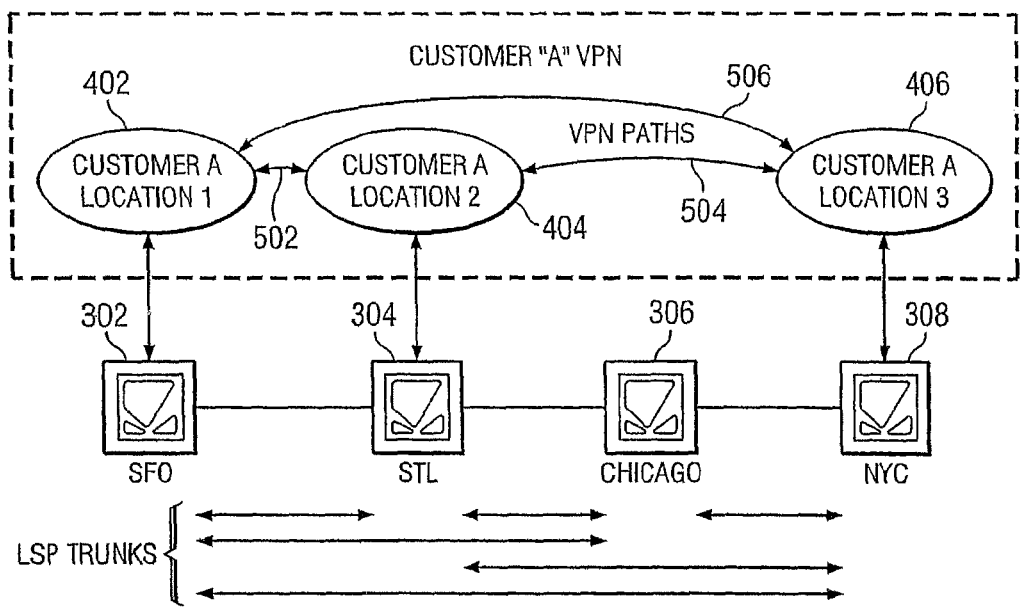
FIG. 5 schematically illustrates example virtual paths for a customer in accordance with an embodiment of the invention.

FIG. 5 schematically illustrates example virtual paths for a customer in accordance with an embodiment of the invention. A private IP path is established to route traffic between customer sites. For example, a private IP path 502 is established between location 1 and location 2, a private IP path 504 is established between location 2 and location 3, and a private IP path 506 is established between location 1 and location 3. In an example embodiment, a private IP path is a logical path. The private IP paths 502, 504, and 506 are unique to customer A and such paths can be policed.

In one embodiment, private IP paths for each customer are associated to each other by a unique VPN group label. In an example embodiment, the established private IP paths for each customer and the associated unique VPN group label provide security guarantees. In addition, the LSP trunks (302, 304, and 308) at each customer site associate data to a known quality and/or a class of service.

Figure 6:
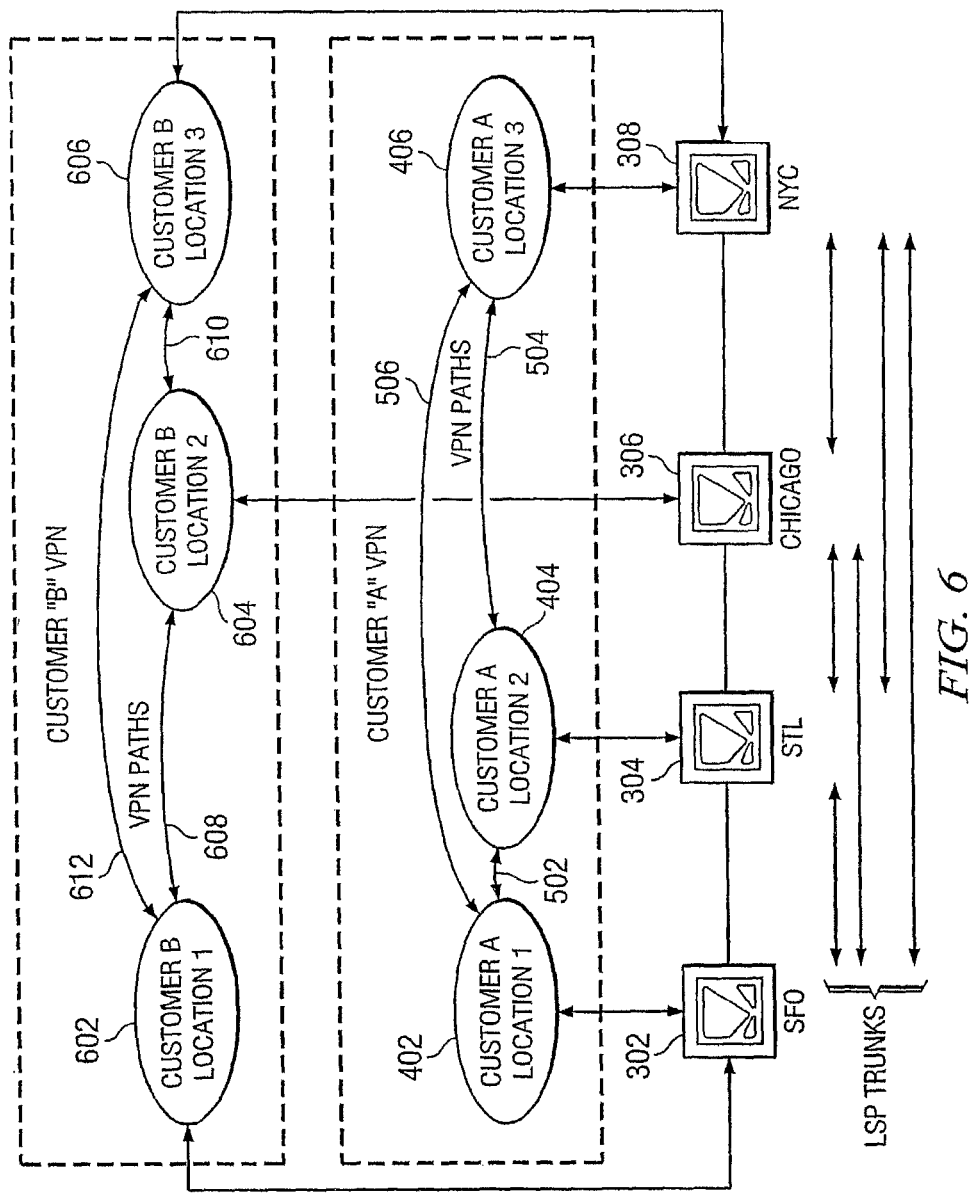
FIG. 6 schematically illustrates example virtual paths for multiple customers in accordance with an embodiment of the invention.

FIG. 6 schematically illustrates multiple VPNs established for multiple customers in accordance with an embodiment of the invention. In FIG. 6, customer B signs up for services at multiple locations (customer sites). A unique VPN label is assigned to each customer site (location) for customer B. As shown, customer B at location 1 is assigned a label 602 stacked on top of LSP trunk 302, customer B at location 2 is assigned a label 604 stacked on top of LSP trunk 306, and customer B at location 3 is assigned a label 606 stacked on top of LSP trunk 308. In an example embodiment, customer sites for customer B are then grouped and assigned a unique VPN group label "B." The unique VPN group label "B" associates customer sites for customer B in a private network. Next, a VPN for customer B is established. For example, a private IP path 608 is established between location 1 and location 2, a private IP path 610 is established between location 2 and location 3, and a private IP path 612 is established between location 1 and location 3. The private IP paths 608, 610, and 612 are unique to customer B and can be policed.

Generally, the separation of the service plane from the network provides significant scalability advantages, one major advantage being that the network does not need to know about the end services offered beyond providing the proper quality of service (QOS) transport. For example, a carrier can establish QOS parameters and design a network using a mesh of LSP trunks. The LSP trunks signaling is propagated and threaded from node-to-node using, for example, common signaling techniques like resource reservation protocol (RSVP) or constraint routing-label distribution protocol (CR-LDP). Network and trunk redundancy parameter(s) get established in advance. After the network is established, the carrier can add customers at the edge of the network. Edge services get signaled end-to-end regardless of whether the network or the LSP trunks are aware that such signaling is taking place. In a sense, the service creation only affects the end node where the service is actually being created. Thus, service creation is scalable because it is signaled from end-to-end. A failure in the network gets dealt with at a network level, for example, by restoring LSP trunks that are usually an order of magnitude lower than the number of services that run on those trunks.

Further example embodiments of the present invention may include a non-transitory computer readable medium embodiment containing instruction that may be executed by a processor that includes code for establishing virtual private networks in a communication network. The code is operable to create a plurality of label switched paths between corresponding locations of service that are optionally not directly linked. Each of the label switched paths that are created provides a class of services. The code is further operable to assign a label to each of the label switched paths. The assigned label identifies a class of services for the label switched paths. The code is still further operable to configure a set of logical service networks to carry multiple virtual private network paths using the label switched paths. The set is so configured via multiprotocol labels.

It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

The foregoing examples illustrate certain example embodiments of the invention from which other embodiments, variations, and modifications will be apparent to those skilled in the art. The invention should therefore not be limited to the particular embodiments discussed above, but rather is defined by the claims.

While this invention has been particularly shown and described with references to example embodiments thereof, it will be understood by those skilled in the art that various changes in form and details may be made therein without departing from the scope of the invention encompassed by the appended claims.

What is claimed is:

1. A method for establishing logical service networks in a communication network, the method comprising:
    identifying label switched paths in an optical transport layer;
    associating each label switched path with a label; and
    establishing at least one logical service network configured to carry at least two virtual private network paths via the label switched paths.

2. The method of claim 1 wherein establishing logical service networks further includes identifying a plurality of service locations within the communication network.

3. The method of claim 1 wherein the groups are configured for transporting at least two virtual routing services (VRS) paths.

4. The method of claim 1 wherein the label identifies a class of service for each of the label switched paths.

5. The method of claim 1 wherein the at least one logical service network is configured according to one of a traffic type, a bandwidth, a delay, a hop count, a guaranteed information rate, and a restoration priority.

6. The method of claim 1 further comprising assigning a unique identifier to each of the service locations for each customer of the communication network.

7. The method of claim 6 further comprising registering a customer at customer locations associated with particular ones of the service locations.

8. The method of claim 7 further comprising assigning a unique logical service network group label to the customer.

9. The method of claim 1 wherein the at least one logical service network is created according to inputs from a service provider.

10. The method of claim 1 wherein the at least one logical service network is created automatically according to software execution.

11. The method of claim 1 further comprising adding customers and customer traffic to the at least one logical service network.

12. The method of claim 1 wherein the logical service networks are virtual private networks.

13. A system for establishing logical service networks in a communication network, the system comprising:
    an identification module configured to identify label switched paths in an optical transport layer;
    an association module configured to associate each label switched path with a label; and
    an establishment module configured to establish at least one logical service network configured to carry at least two virtual private network paths via the label switched paths.

14. The system of claim 13 wherein the identification module is further configured to identify a plurality of service locations within the communication network.

15. The system of claim 13 wherein the groups are configured for transporting at least two virtual routing services (VRS) paths.

16. The system of claim 13 wherein the label identifies a class of service for each of the label switched paths.

17. The system of claim 13 wherein the at least one logical service network is configured according to one of a traffic type, a bandwidth, a delay, a hop count, a guaranteed information rate, and a restoration priority.

18. The system of claim 13 further comprising an assignment module configured to assign a unique identifier to each of the service locations for each customer of the communication network.

19. The system of claim 18 wherein the assignment module is further configured to assign a unique logical service network group label to the customer.

20. The system of claim 18 further comprising a registration module configured to register a customer at customer locations associated with particular ones of the service locations.

21. The system of claim 13 wherein the at least one logical service network is created according to inputs from a service provider.

22. The system of claim 13 wherein the at least one logical service network is created automatically according to software execution.

23. The system of claim 13 further configured to add customers and customer traffic to the at least one logical service network.

24. The system of claim 13 wherein the logical service networks are virtual private networks.

25. A system for establishing logical service networks in a communication network, the system comprising:

means for identifying label switched paths in an optical transport layer;

means for associating each label switched path with a label; and means for establishing at least one logical service network configured to carry at least two virtual private network paths via the label switched paths.

26. A computer program product including a computer readable medium having computer readable instructions to switch communications traffic in a communications network, wherein the computer readable instructions, when executed by a processor, cause the processor to:

identify label switched paths in an optical transport layer;

associate each label switched path with a label; and establish at least one logical service network configured to carry at least two virtual private network paths via the label switched paths.

27. A method for establishing logical service networks in a communication network, the method comprising:

configuring service locations and a plurality of logical service paths into a plurality of logical service networks according to labels;

assigning a unique customer identifier for each customer at the service locations; and assigning a unique group identifier for each logical service network containing the unique customer identifier.

* * * * *

UNITED STATES PATENT AND TRADEMARK OFFICE
CERTIFICATE OF CORRECTION

PATENT NO.        : 8,553,705 B2
APPLICATION NO.   : 13/205158
DATED             : October 8, 2013
INVENTOR(S)       : Michael Kazban et al.

Page 1 of 1

It is certified that error appears in the above-identified patent and that said Letters Patent is hereby corrected as shown below:

On the Title Page, Item (73) in the Assignee section delete "Tellabs San Jose, Inc., Naperville, IL (US)" and insert -- Tellabs Operations, Inc., Naperville, IL (US) --

Signed and Sealed this
Twenty-fifth Day of February, 2014

Michelle K. Lee
*Deputy Director of the United States Patent and Trademark Office*